June 25, 1968          W. E. BELL          3,390,351
VACUUM SEALING OF GAS LASER WINDOWS
Filed May 15, 1963
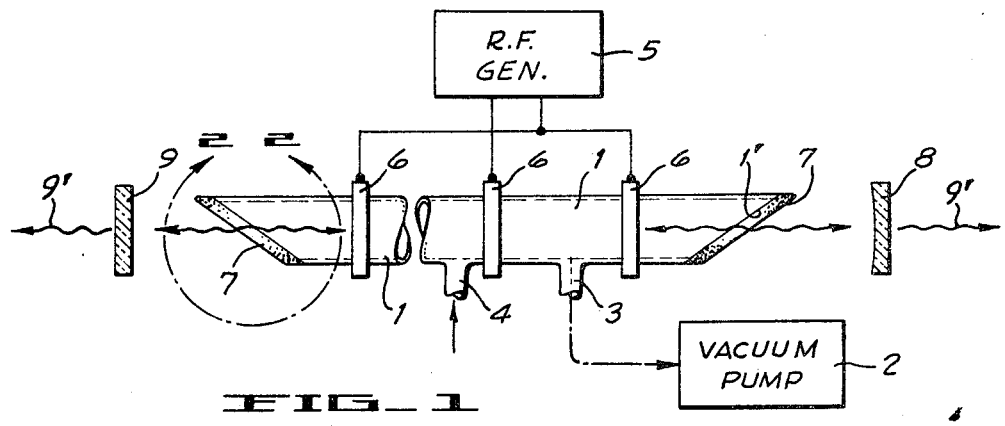
FIG_1
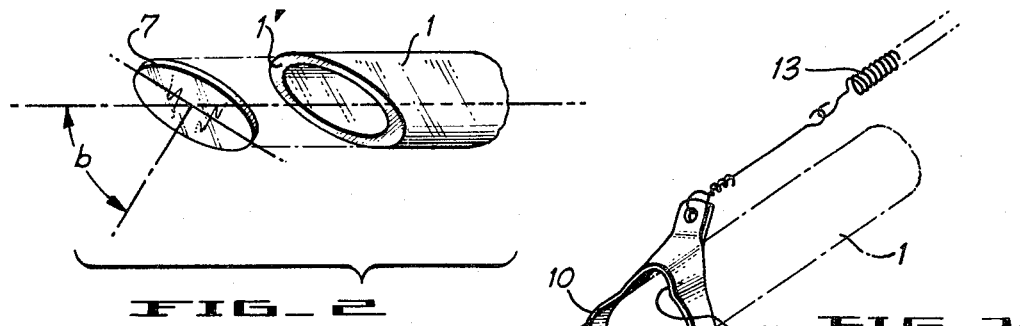 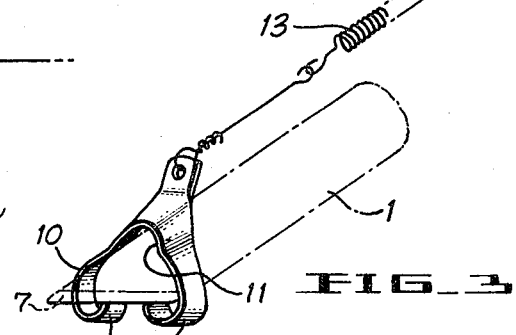
FIG_2          FIG_3
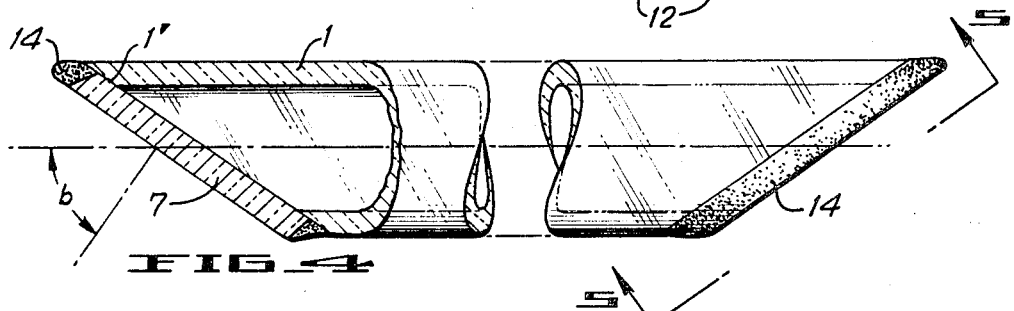
FIG_4
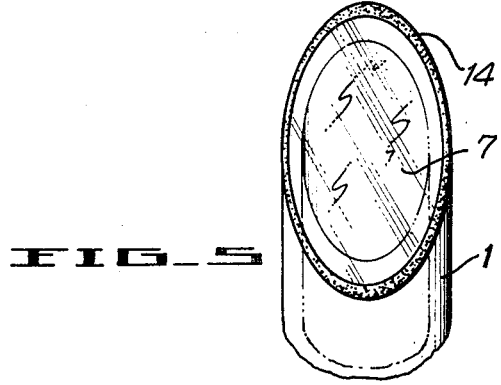
FIG_5
WILLIAM E. BELL
INVENTOR.
BY J. Rosenblum
ATTORNEY

United States Patent Office 3,390,351
Patented June 25, 1968

3,390,351
VACUUM SEALING OF GAS LASER WINDOWS
William E. Bell, Palo Alto, Calif., assignor to Spectra-Physics, Inc., Mountain View, Calif., a corporation of California
Filed May 15, 1963, Ser. No. 280,514
7 Claims. (Cl. 331—94.5)

The present invention relates in general to gas lasers, and more particularly to a novel method and structure for sealing high optical quality windows to the vacuum envelope of the laser tube.

A typical gas laser (or optical maser) comprises a vacuum-sealed tube containing, for example, a mixture of 10% neon and 90% helium at a pressure of about 2 torr., the mixture being excited by an electrical discharge to emit optical radiation at both infrared and visible wavelengths. A pair of mirrors exhibiting a high reflectance at one particular wavelength is used to form an optical resonator in which standing waves of that wavelength are established in the laser tube by repeated axial reflections from the mirrors. The standing wave is amplified by stimulated emission interaction with excited atoms in the discharge, and the small transmission through the mirrors provides an intense, spatially coherent, and highly monochromatic output beam.

In order to facilitate adjustment and modification of the optical resonator, and also to protect the fragile dielectric mirror coatings, it is desirable to mount the mirrors external to the discharge tube. In order to minimize losses in the transmission to such external mirrors, the discharge tube is vacuum-sealed at each end with an optically flat window oriented at Brewster's angle 55° 32' for quartz) to the tube axis. A typical prior art laser of this type is disclosed in the article "Construction of a Gaseous Optical Maser Using Brewster Angle Windows" by D. J. Brangaccio in Review of Scientific Instruments, vol. 33, No. 9, September 1962, pp. 921–922.

Heretofore the optical windows have been vacuum-sealed to the discharge tube by fusing these two parts together at high temperatures. This process tends to deteriorate the optical transmission qualities of the windows as a consequence of the formation of strain distortions and opaque rings of devitrification, and also of deviations in the inclination angle of the window. Moreover the two members of such a seal are required to have substantially the same coefficients of thermal expansion. In view of these difficulties, it has been necessary to enlarge the size of the windows so as to minimize optical imperfections and misalignment in the central beam portion of the window. Since the windows must be optically flat, increasing their size greatly increases their cost; and when the windows become sufficiently large, they may suffer from distortion and strain due to atmospheric pressure. Also a plurality of seals must be used for window alignment re-adjustment, and for thermally-graded matching when, as is usual, the expansion characteristics of the window differ substantially from those of the tube, thereby further adding to the complexity and cost of construction.

It is the principal object of the present invention to overcome these and other difficulties of the prior art by the provision of a vacuum-tight window seal which does not require high temperature treatment, which does not mechanically strain or deform the windows, and which can be used with parts of substantially different coefficients of expansion. Generally speaking, this is accomplished by means of a plastic sealing ring formed, for example, by the deposition of epoxy resin cement.

The various features and advantages of the present invention will become apparent upon a consideration of the following specification, taken in connection with the accompanying drawing, wherein:

FIGURE 1 is a simplified, partially schematic, elevational view of a gas discharge laser with Brewster windows and external mirrors;

FIGURE 2 is an exploded perspective view of the discharge tube-window assembly encircled by line 2—2 in FIGURE 1;

FIGURE 3 is a perspective view of a clamping fixture used in the process of sealing the assembly of FIGURE 2;

FIGURE 4 is a cross-sectional view of the laser of FIGURE 1 illustrating, in detail, a sealing ring in accordance with the present invention; and FIGURE 5 is a view taken in the direction of line 5—5 in FIGURE 4.

FIGURE 1 illustrates an example of a gas laser in accordance with the present invention. The plasma envelope tube 1 is evacuated by a pump 2 through port 3. A gas, for example a mixture of 90% helium and 10% neon, is admitted through port 4 to a pressure on the order of 2 torr. The ports 3 and 4 are then sealed off.

An optically-radiating electrodeless discharge is struck in the plasma tube by means of an R-F generator 5 which energizes a plurality of capacitively-coupled straps 6 distributed along the tube with alternate straps being electrically connected. Optical radiation at the desired wavelength is transmitted through vacuum-tight windows 7 and then axially reflected by frequency-selective resonator mirrors 8 and 9. As one example of a resonator configuration, mirror 8 may be spherical and mirror 9 flat, with a mirror separation equal to the radius of curvature of mirror 8. The small transmission through the mirrors provides the output beams 9'.

According to the present invention, the ends of the discharge tube 1 are ground off to form guiding surfaces 1' at the desired window-orientation angle. Usually this will be Brewster's angle $b$ (between the tube axis and the normal to window) at which there is maximum transmission for radiation polarized in the plane of incidence. In the case of quartz (fused silica) windows, Brewster's angle is 55° 21' at visible wavelengths. As shown in FIGURE 2, the windows 7 are elliptically-shaped to conform the slanted opening in the end of the tube. The windows are ground to a flatness on the order of $1/100$ of an average operating wavelength in order to achieve the desired high optical transmission quality. The guiding surface of the tube is ground to a degree of smoothness which gives a definition of the angle $b$ to within about 15 minutes of arc.

As shown in FIGURE 3, the window 7 is temporarily clamped to the tube by means of a spring-loaded heart-shaped harness 10. The inside-back surface 11 conforms to the tube 1, and the inwardly directed fingers 12 exert a compressive force on the windows 7 via spring assembly 13 which is stretched-out and fixed to the other end of the tube. A plastic sealing ring 14 is then fixed to the interface between the window 7 and tube 1 as shown in FIGURES 4 and 5.

In order to achieve the objectives of the present invention, ring 14 is characterized by the following properties:
 (a) A low vapor pressure so as to avoid contamination of the laser gas with argonic vapors;
 (b) Chemical inertness to avoid reaction with the laser gas, or with window cleaning agents such as acetone;
 (c) A high degree of plasticity so that any holding strain is taken up by the ring rather than the window;
 (d) Ability to set without the application of heat greater than about 500° F.; and
 (e) A high flow viscosity to accommodate different coefficients of expansions as, for example, when the window is made of quartz and the tube is Pyrex borosilicate glass.

Another example is a window made of a material having high transmission in the infrared (for example, barium fluoride) sealed to a glass tube.

Epoxy resins are commercially available which meet these requirements. One example is "Torr Seal," a metal-filled epoxy resin cement sold by Varian Associates of Palo Alto Calif. for purpose of repairing small leaks in vacuum systems. This cement is furnished with a hardening agent so that the seal will cure at room temperature or moderate heat (up to 140° F.). In practice, it is convenient to apply two diametrically-opposed holding patches of cement, heat the seal for several minutes at 125° F., remove the clamp, apply the cement around the entire window-tube interface, and then reheat at 120° F. to form the final seal.

One potential disadvantage of the above-described seal is that the tube cannot be subjected, during the evacuation process, to a high-heat bakeout of gases trapped in the walls. I have found, however, that such residual gases are removed with remarkable effectiveness by running a high power discharge. For example, as shown in FIGURE 1, the tube is pumped down to a pressure of approximately $10^{-5}$ torr., and then a radio transmitter with several hundred watts output is attached to the electrodes 6 in the place of the lower power (about 40 watts) laser discharge source 5 as the tube is pumped down further to about $10^{-7}$ torr. In effect, the electric field produced by the discharge source causes an intense local heating of wall-trapped gases without adverse effect on the window seal.

I claim:

1. In a gas laser, the combination comprising: an envelope containing an optically-radiating gas, said envelope having at least one opening surrounded by a smooth guiding surface in precisely defined orientation relative to said envelope; at least one window of high optical quality, said window having a high optical quality surface facing inwardly of said envelope, a peripheral portion of said window surface conforming to and being in direct contact with said smooth guiding surface to thereby position said window in said precisely defined orientation relative to said envelope; and plastic sealing means disposed only outside and peripherally of said contacting portion of said window surface for joining said window to said envelope, said sealing means mechanically holding said window to said envelope in said precisely defined orientation relative to said evelope and in vacuum sealing relationship therewith, communication of contaminating vapors from said plastic sealing means to the laser gas being effectively avoided, and said sealing means having sufficient plasticity that holding strain is taken up by the sealing means rather than the window.

2. The combination of claim 1 wherein said plastic sealing means is further characterized by:
   (a) a low vapor pressure to avoid contamination of said gas;
   (b) chemical inertness to avoid reaction with said gas and with window cleaning agents; and
   (c) the ability to set without the application of heat greater than about 500° F.

3. The combination of claim 1 wherein said envelope and said window have substantially different coefficients of thermal expansion, and said plastic sealing means is further characterized by sufficient flow viscosity to accommodate said difference.

4. The combination of claim 1 wherein said plastic sealing means is a seal of epoxy resin deposited about the outside edge of the contacting portion of said window.

5. The combination of claim 1 wherein said envelope is a tubular envelope with one of said smooth guiding surfaces being formed as a flat surface at each end of said tubular envelope and one of said windows contacting each of said flat guiding surfaces, each of said windows being ground to a flatness of a fraction of the wavelength of the optical radiation radiated by said gas.

6. The combination of claim 5, further comprising: a pair of mirrors external to said tubular envelope for reflecting optical radiation passing through said windows back along the axis of said tubular envelope; and means exciting said gas for effecting stimulated emission amplification of said reflected radiation.

7. The combination of claim 6 wherein each of said flat surfaces is inclined to the axis of said tubular envelope at substantially Brewster's angle for transmission of said mirror-reflected radiation through said windows.

References Cited

UNITED STATES PATENTS

| | | | |
|---|---|---|---|
| 1,616,431 | 2/1927 | Rentschler | 316—26 |
| 3,010,045 | 11/1961 | Plagge et al. | 313—112 |
| 3,183,937 | 5/1963 | Earley et al. | 331—94.5 |

OTHER REFERENCES

Sona et al. "He-Ne Optical Masers: Construction and Measurements", Alta Frequenza, vol. 31, No. 11, November 1962, pp. 718–721.

Rigrod et al.: "Gaseous Optical Maser With External Concave Mirrors," Journal Applied Physics, vol. 33, No. 2, February 1962, pp. 732–744.

JEWELL H. PEDERSEN, *Primary Examiner.*

RONALD L. WIBERT, *Examiner.*